United States Patent

Scherbaum

[15] 3,643,131

[45] Feb. 15, 1972

[54] ELECTRICAL DEVICE HAVING LIQUID-COOLED CLAMPED DISC CELLS

[72] Inventor: Friedrich Scherbaum, Munich, Germany

[73] Assignee: Siemens Aktiengesellschaft, Berlin and Munich, Germany

[22] Filed: May 1, 1970

[21] Appl. No.: 33,721

[30] Foreign Application Priority Data

May 10, 1969 Germany ........................P 19 24 011.0

[52] U.S. Cl. ..........................................317/100, 317/234 A
[51] Int. Cl. ..........................................................H01l 1/12
[58] Field of Search.................174/DIG. 5, 15; 317/100, 234

[56] References Cited

UNITED STATES PATENTS

| | | | |
|---|---|---|---|
| 2,815,472 | 12/1957 | Jackson | 317/100 X |
| 3,143,592 | 8/1964 | August | 317/100 X |
| 3,238,425 | 3/1966 | Geyer | 317/234 |

*Primary Examiner*—Lewis H. Myers
*Assistant Examiner*—Gerald P. Tolin
*Attorney*—Curt M. Avery, Arthur E. Wilfond, Herbert L. Lerner and Daniel J. Tick

[57] ABSTRACT

An electrically conductive liquid-cooled conductor bar has a plurality of seats thereon, each of said seats for accommodating a corresponding one of a plurality of disc cells. Each of a plurality of subordinated pressure components clamps a corresponding one of the disc cells to the corresponding one of the seats. Each of the pressure components has a cooling duct therein for conducting a coolant and such cooling ducts are coupled to each other by a plurality of elastic coupling ducts thereby permitting a coolant to flow through the pressure components. A slide rail is positioned in spaced parallel relation to the conductor bar. One of a pair of spaced bolts is provided on each side of each of the disc cells and its corresponding pressure component. The bolts couple the slide rail to the conductor bar in a manner whereby each of the disc cells and its corresponding pressure component is enclosed by a frame comprising part of the conductor bar, part of the slide rail and the bolts. Each of a plurality of clamping devices is positioned between a corresponding one of the pressure components and a corresponding part of the slide rail, each of the clamping devices abutting the corresponding one of the disc cells on its surface opposite that adjacent the conductor bar.

9 Claims, 5 Drawing Figures

ELECTRICAL DEVICE HAVING LIQUID-COOLED CLAMPED DISC CELLS

The invention relates to an electrical device having liquid-cooled disc cells. More particularly, the invention relates to a current rectifier or converter having liquid-cooled disc cells. The electrical device of the invention has a liquid-cooled conductor bar and at least two disc cells clamped between subordinated pressure components and seats on the bar.

In a known converter, all the disc cells are clamped between two conductor bars which are in spaced parallel relation to each other. The necessary contact pressure is produced by a spring device which is positioned between one of the two conductor bars and one of the two contact areas of each of the disc cells. As a result, the disc cells are optimally cooled only on the contact surface, side or area which abuts the water-cooled or liquid-cooled conductor bar. Symmetrical cooling of the disc cells may be provided only by clamping the disc cells directly between both water-cooled conductor bars. Thus, symmetrical cooling cannot be realized without entailing considerable difficulties since it is hardly feasible to exactly rate the contact pressure of the adjacent disc cells, clamped between the conductor bars, and to thereby obtain a uniform surface pressure. It is a disadvantage of such an arrangement that in order to exchange a disc cell, one of the two massive conductor bars would have to be at least partly moved, separated or loosened. Furthermore, all the disc cells must be supported in a manner whereby none of them can slip out of its assigned position. The symmetrical cooling concept permits the construction of only a parallel circuit of disc cells.

In contrast to the foregoing arrangement, the object of the invention is to provide a converter of the aforedescribed type which is such that when liquid cooling is utilized, symmetrical heat transfer occurs from the disc cells, the contact pressures at the individual disc cells may be readily adjusted with facility and independence, each from the other, without the necessity for irregular surface pressures, and each of the disc cells may be simply removed or exchanged without impairment of the contacts of the other disc cells.

The principal object of the invention is to provide a new and improved electrical device having liquid cooled disc cells.

An object of the invention is to provide an electrical device in which symmetrical heat transfer is provided from each of a plurality of liquid cooled disc cells.

An object of the invention is to provide an electrical device having liquid-cooled disc cells on which the contact pressures at the individual disc cells may be adjusted with facility and independence from the other disc cells, without the necessity for irregular surface pressures.

An object of the invention is to provide an electrical device having liquid-cooled disc cells in which each disc cell may be removed or replaced without the impairment of the contacts of the other disc cells.

An object of the invention is to provide liquid cooling of a plurality of disc cells with efficiency, effectiveness and reliability.

In accordance with the invention, an electrical device for liquid cooling of a plurality of disc cells comprises an electrically conductive liquid-cooled conductor bar having a plurality of seats thereon. Each of the seats accommodates a corresponding one of a plurality of disc cells. Each of a plurality of subordinated pressure components clamps a corresponding one of the disc cells to the corresponding one of the seats. Each of the pressure components has a cooling duct therein for conducting a coolant. A plurality of elastic coupling ducts couples the cooling ducts of the pressure components to each other thereby permitting a coolant to flow through the pressure components. A slide rail is positioned in spaced parallel relation to the conductor bar. A pair of frame means is provided one on each side of each of the disc cells and its corresponding pressure component. The frame means couples the slide rail to the conductor bar in a manner whereby each of the disc cells and its corresponding pressure component is enclosed by a frame comprising part of the conductor bar, part of the slide rail and the frame means. Each of a plurality of clamping devices is positioned between a corresponding one of the pressure components and a corresponding part of the slide rail. Each of the clamping devices abuts the corresponding one of the disc cells on its surface opposite that adjacent the conductor bar.

The frame means comprises a pair of spaced bolts. A plurality of spacer components is provided around each of the bolts and extends between the conductor bar and the slide rail. The slide rail comprises a single continuous slide rail and all of the disc cells are clamped between the conductor bar and the slide rail via the corresponding subordinated pressure components and the corresponding clamping devices.

Each of the seats is positioned centrally between each adjacent pair of bolts. One of the bolts is positioned between each adjacent pair of seats. The slide rail is elastic.

The clamping device comprises a clamp threadedly coupled to the slide rail for axial movement relative thereto and an intermediate plate. The clamp abuts the intermediate plate. The clamp is externally threaded. The clamping device further comprises an internally threaded component threadedly coupled to the clamp and nonrotatably mounted on the slide rail in a manner whereby it is displaceable parallel to the axis of the clamp. A spring device is positioned around the internally threaded component between the end of the internally threaded component and the slide rail and urges the internally threaded component and the clamp against the pressure component.

In order that the invention may be readily carried into effect, it will now be described with reference to the accompanying drawings, wherein.

In the FIGS., the same components are identified by the same reference numerals.

Figure 1:
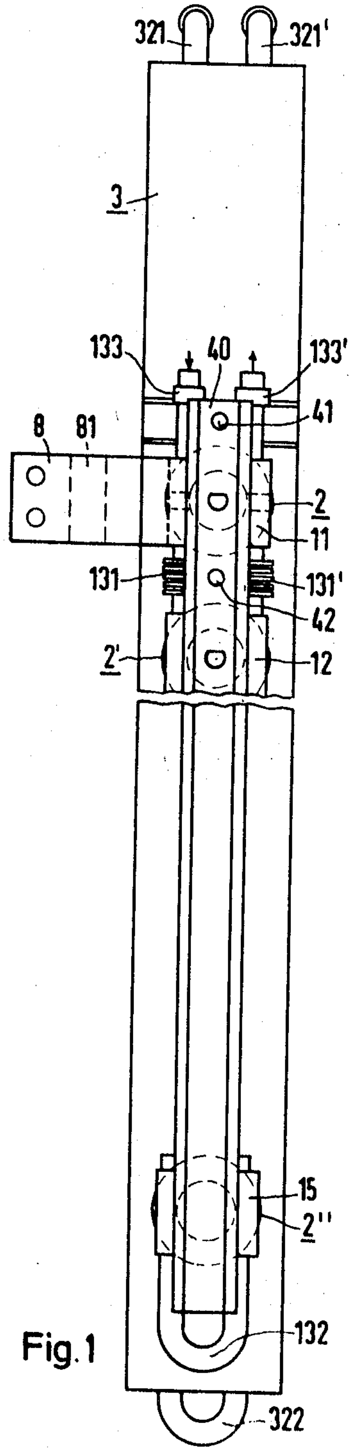
FIG. 1 is a top view of an embodiment of the electrical device of the invention.
Figure 2:
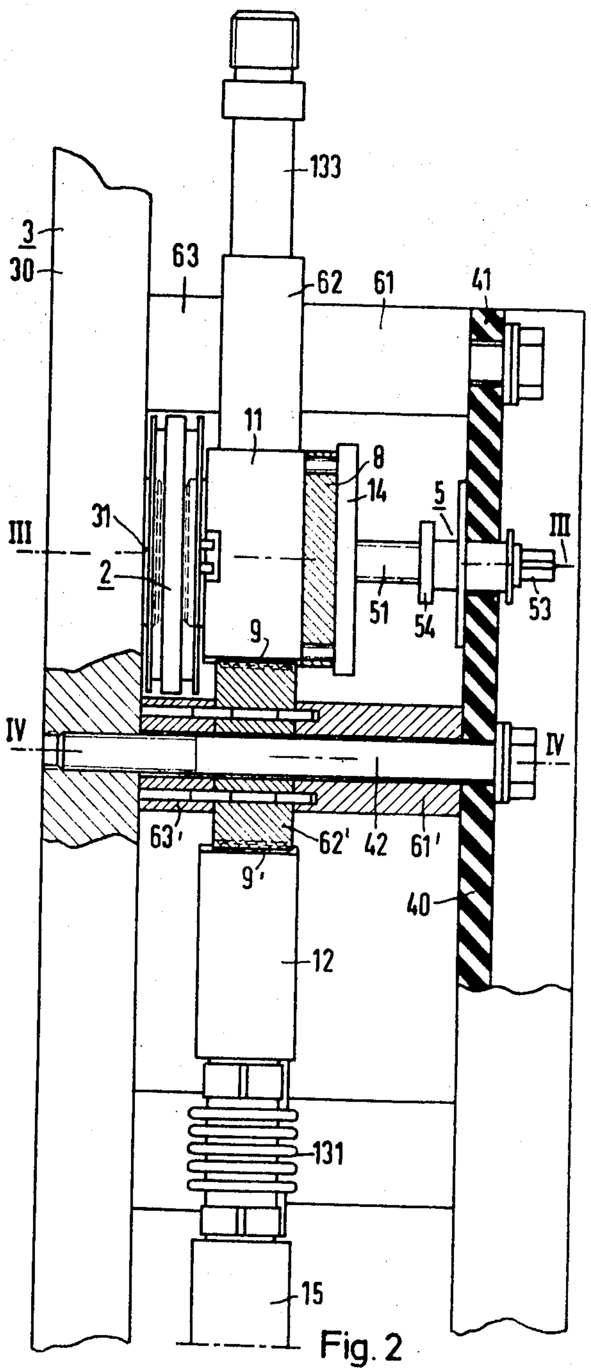
FIG. 2 is a side view, partly in section, of the embodiment of FIG. 1, on an enlarged scale.

A plurality of seating locations or seats 31 (FIG. 2), such as for example six seats, are mounted on a conductor bar 3 (FIGS. 1 and 2). The conductor bar 3 conducts electricity and may comprise, for example, copper. The conductor bar 3 is cooled by coolant ducts, channels, tubes, or the like, 32 and 32' (FIGS. 3 and 4).

Figures 3, 4, 5:
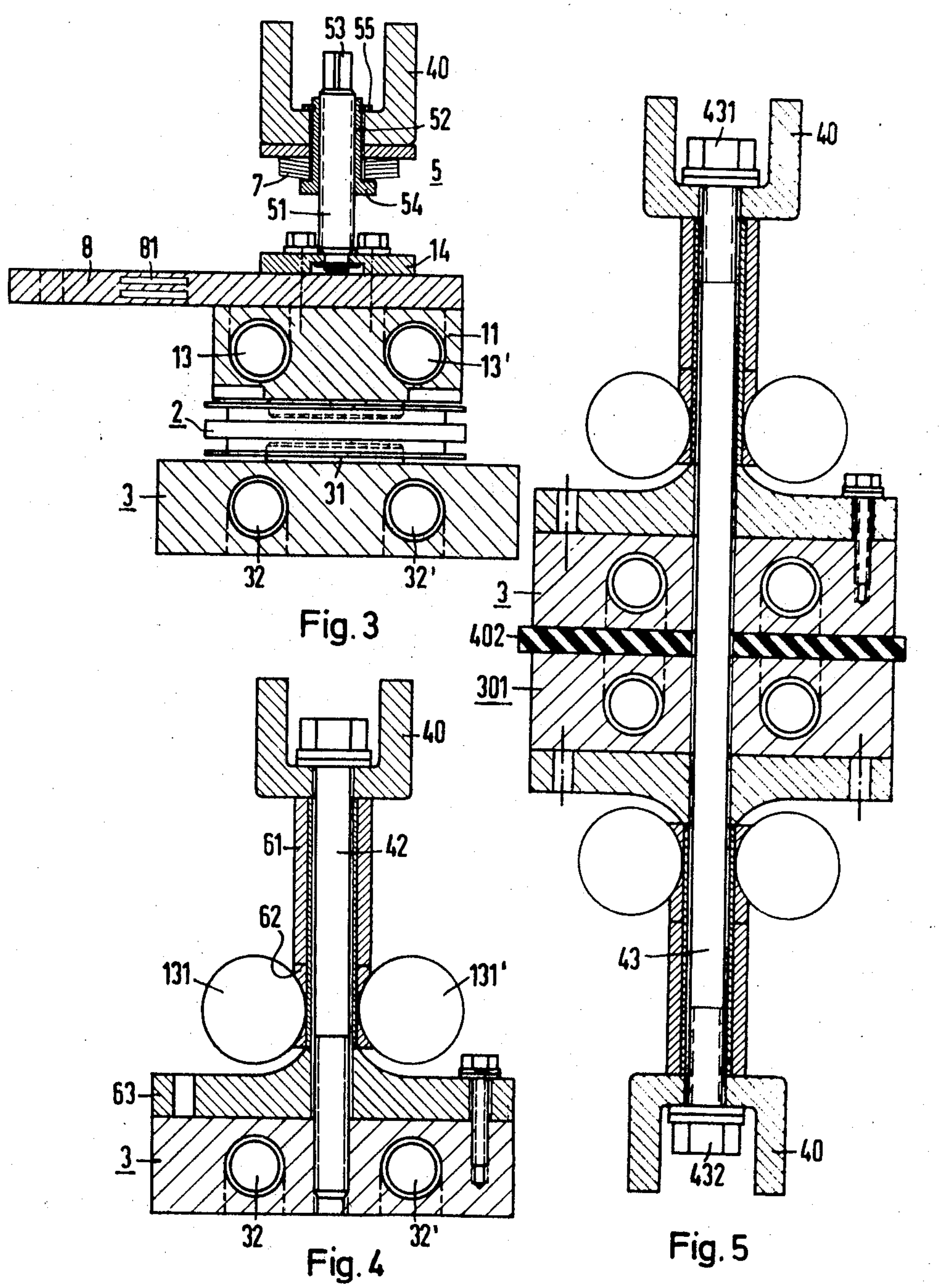
FIG. 3 is a sectional view taken along the lines III—III of FIG. 2.
FIG. 4 is a sectional view taken along the lines IV—IV of FIG. 2.
FIG. 5 is a sectional view of another embodiment of the electrical device of the invention.

The coolant ducts 32 and 32' are embedded in the conductor bar 3, from behind (FIGS. 3 and 4). The coolant ducts 32 and 32' are in spaced parallel relation to each other, and are connected to each other, at one end, via a coupling or curved section 322 (FIG. 1). The other end of each of the coolant ducts 32 and 32' terminates in an end portion 321 and 32' respectively.

Each seat 31 is provided with a disc cell 2, 2', 2'', and so on (FIGS. 1, 2 and 3). Each disc cell comprises a controlled or noncontrolled rectifier. Only a few of the disc cells 2, 2', 2'', and so on, are illustrated in FIG. 1. Since my invention is primarily concerned with the clamping of the individual disc cells 2, 2', 2'', and so on, and such clamping is identical for each of said disc cells, only one disc cell is illustrated in each of FIGS. 2 and 3. A slide rail or slide bar 40 (FIG. 2) is provided in spaced parallel relation with the conductor bar 3. The distance or space between the conductor bar 3 and the slide bar 40 is determined by spacing components or spacers 61, 62 and 63 (FIG. 2). The slide rail 40 is coupled to the conductor bar 3 by bolts 41 and 42. The slide bar or rail 40 preferably comprises electrically insulating material and is preferably of U-shaped configuration (FIGS. 3, 4 and 5).

The bolts 41 and 42 which couple the slide bar 40 to the conductor bar 3 are equidistantly spaced from each other and each of said bolts is positioned centrally between a pair of correspondingly adjacent seats 31. Only one such seat is illustrated in FIG. 2. The contact surface of each of the disc cells 2, 2′, 2″, and so on, which is on the side of the disc cell opposite the conductor bar 3, is provided with a corresponding one of a plurality of pressure or clamping components 11, 12, 15, and so on (FIG. 2). Each of the pressure components 11, 12, 15, and so on, abuts and bears on the corresponding one of the disc cells 2, 2′, 2″, and so on.

Each of the pressure components 11, 12, 15 comprises two continuous cooling ducts 13 and 13′ (FIG. 3) embedded therein. A current tape or flexible conductor 8 (FIGS. 1, 2 and 3) is clamped between each of the pressure components and a plate 14 (FIGS. 2 and 3). The current tape 8 provides an elastic area 81 (FIGS. 1 and 3). The current conductor 8 is thus provided for each of the disc cells 2, 2′, 2″, and so on, and is pressed against each disc cell with the assistance of a clamping device or clamp 5 (FIG. 2).

Each of the clamping devices 5 abuts or braces against the plate 14 at one end of said clamping device (FIGS. 2 and 3) and abuts or braces against part of the slide rail 40 at the other end of said clamping device (FIGS. 2 and 3). Each of the plurality of clamping devices 5, of which only one is shown in each of FIGS. 2 and 3, comprises a clamping portion or clamp 51 having an external thread thereon and a screwhead 53 (FIGS. 2 and 3). Each clamping device 5 further comprises an internally threaded component 52 (FIG. 3) which is threadedly coupled on the clamp 51 and is mounted in the bar 40. The internally threaded component 52 is mounted in the slide bar 40 in nonrotatable relation but is displaceable in directions parallel to the axis of the clamp 51.

The axial displacement of the internally threaded component 52 is limited by a stop 54 (FIGS. 2 and 3) and a Seger or latch ring 55 (FIG. 3). A spring device 7 (FIG. 3) is coaxially positioned around the internally threaded component 52, between the stop 54 of said component and the slide rail 40. The spring device 7 comprises a plurality of disc or washer-type springs, or any other type of suitable springs members.

As shown in FIG. 2, a corresponding portion 30 of the conductor bar 3, a corresponding portion of the slide bar or slide rail 40, and the corresponding bolts 41 and 42 and their corresponding spacers 61, 62 and 63 and 61′, 62′, 63′, together constitute a frame. In each frame 30, 40, 41, 42, 61, 62, 63, a disc cell 2 is clamped between a corresponding seat 31 on the conductor bar 3 and a corresponding clamp 51 (FIG. 2). The pressure applied by the clamping device 5 on each of the corresponding disc cells 2 may be varied by rotation of the clamp 51.

Since each of the spring devices 7 (FIG. 3) is clamped between the stop 54 of the internally threaded component 52 to which it corresponds and the slide rail 40, each of said spring devices determines the force or pressure which is exerted on the corresponding disc cell. The pressure should be approximately 90 to 125 kilopounds per square centimeter. The spring device 7 may be eliminated. In such case, the internally threaded component 52 is rotated on the clamp 51 until its stop 54 abuts the slide rail 40 and said slide rail is elastically deformed if said clamp is further tightened.

The individual pressure components 11, 12, 15, and so on, are aligned with the assistance of guides 9, 9′, and so on, relative to the spacers 62, 62′, and so on, so that openings of the cooling ducts 13 and 13′ of adjacent ones of said pressure components face each other. The cooling ducts 13 and 13′ may thus be continuously connected with facility and rapidity by elastic connecting links or couplings 131 and 131′, respectively (FIGS. 1, 2 and 4). The couplings or links 131 and 131′ may comprise, for example, hoses, tubes or pipes of insulating material.

When the two ducts 13 and 13′ of the last pressure component of the plurality of pressure components 11, 12, 15, and so on, are interconnected by a coupling link 132 (FIG. 1), and said ducts of the first pressure component 11 are connected into a cooling system of the conductor bar 3, via a pair of couplings 133 and 133′, respectively (FIG. 1), the pressure components are cooled in a manner corresponding to the cooling of the conductor bar 3. Thus, in accordance with my invention, all the disc cells 2, 2′, 2″, and so on, are uniformly cooled on both sides thereof.

FIG. 5 shows another embodiment of the electrical device of the invention relating to two corresponding disc cells. The free, larger area sides of a pair of conductor bars 3 and 301 are positioned opposite each other. An insulating plate 402 is interposed between the conductor bars 3 and 301. The bolts 41 and 42 of the embodiment of FIGS. 1 to 4 are replaced by a bolt 43. The bolt 43 is continuous and is insulated from the conductor bars 3 and 301. The bolt 43 assists in bracing both disc cell arrangements against each other with the aid of a pair of nuts 431 and 432.

When each of a pair of disc cells (not shown in FIG. 5) is placed on a corresponding one of the conductor bars 3 and 301, with the appropriate polarity, and the pressure components subordinated to one of said conductor bars are coupled to the other of said conductor bars, all the disc cells of both conductor bars are in parallel connection. The parallel connection of disc cells provides very good current distribution. The embodiment of FIG. 5, provided with two groups of 12 disc cells each of well preserved type, is able to withstand 12,000 amperes at a constant load of 1,000 volts.

In the electrical device of the invention, a uniform surface pressure is provided over the entire contact surface of each of the disc cells 2, 2′, 2″, and so on. This is due to the aforedescribed clamping arrangement for each of the disc cells, including the elastic coupling of the individual pressure components with each other via the coupling links 131 and 131′. Furthermore, the clamp 51, which abuts the plate 14 at only one point (FIG. 3) is of conical configuration at the point of abutment or bearing point.

Another advantage of the electrical device of the invention is the facility and rapidity with which a disc cell may be removed or exchanged. This is due to the fact that the corresponding clamp 51 need only be loosened slightly to permit the removal of the corresponding disc cell. This does not impair the clamping of the adjacent disc cells or the electrical connection thereof.

Another advantage of the electrical device of the invention is that all the disc cells are connected in parallel and a midpoint connection may be provided with particular simplicity, so that the conductor bar 3 conducts the direct current and the corresponding current tapes or current conductors 8 provide single-phase or multiphase alternating current; said current conductors being connected to the terminals of a suitable alternating current source.

If two conductor bars 3 of the aforedescribed type are utilized with a plurality of disc cells and pressure devices, a rectifier bridge circuit may be constructed wherein said conductor bars function as the DC terminals and the current conductors 8 are connected to an AC voltage source. This possibility is of special importance when the disc cells are utilized in excess of 500 amperes, since in such instance, the number of disc cells connected in parallel in each branch is relatively low. This enables the economic advantages of the electrical device of the invention to be utilized by providing a single conductor bar with the disc cells of all the rectifier branches leading to a common point such as, for example, a DC bus bar.

While the invention has been described by means of specific examples and in specific embodiments, I do not wish to be limited thereto, for obvious modifications will occur to those skilled in the art without departing from the spirit and scope of the invention.

I claim:

1. An electrical device for liquid cooling of a plurality of disc cells, comprising an electrically conductive liquid cooled conductor bar having a plurality of seats thereon, each of said seats accommodating a corresponding one of a plurality of disc cells;

a plurality of subordinated pressure components each clamping a corresponding one of the disc cells to the corresponding one of said seats, each of said pressure components having a cooling duct therein conducting a coolant;

a plurality of elastic coupling ducts coupling the cooling ducts of said pressure components to each other;

a plurality of pairs of frame means;

a slide rail in spaced parallel relation to said conductor bar and connected to said conductor bar by the plurality of pairs;

of frame means one on each side of each of a plurality of disc cells and its corresponding pressure component, said frame means coupling said slide rail to said conductor bar in a manner whereby each of said disc cells and its corresponding pressure component is enclosed by a frame comprising part of said conductor bar, part of said slide rail and said frame means; and a plurality of clamping devices connected to the slide rail, each clamping device being positioned between a corresponding one of said pressure components and a corresponding part of said slide rail, each of said clamping devices pressing the corresponding one of said disc cells on its surface opposite that adjacent said conductor bar.

2. An electrical device as claimed in claim 1, wherein each of said frame means comprises a pair of spaced bolts.

3. An electrical device as claimed in claim 2, further comprising a plurality of spacer components around each of said bolts and extending between said conductor bar and said slide rail.

4. An electrical device as claimed in claim 3, wherein said slide rail comprises a single continuous slide rail and all of said disc cells are clamped between said conductor bar and said slide rail via said corresponding subordinated pressure components and said corresponding clamping devices.

5. An electrical device as claimed in claim 4, wherein each of said seats is positioned centrally between each adjacent pair of bolts.

6. An electrical device as claimed in claim 5, wherein one of said bolts is positioned between each adjacent pair of seats.

7. An electrical device as claimed in claim 6, wherein said clamping device comprises a clamp threadedly coupled to said slide rail for axial movement relative thereto, and an intermediate plate, said clamp abutting said intermediate plate.

8. An electrical device as claimed in claim 7, wherein said slide rail is elastic.

9. An electrical device as claimed in claim 7, wherein said clamp is externally threaded and said clamping device further comprises an internally threaded component threadedly coupled to said clamp and nonrotatably mounted on said slide rail in a manner whereby it is displaceable parallel to the axis of said clamp, and a spring device positioned around said internally threaded component between the end of said internally threaded component and said slide rail and urging said internally threaded component and said clamp against said pressure component.

* * * * *